(12) United States Patent
Okumura

(10) Patent No.: US 11,156,400 B2
(45) Date of Patent: Oct. 26, 2021

(54) METHOD FOR MANUFACTURING HONEYCOMB STRUCTURE

(71) Applicant: NGK INSULATORS, LTD., Nagoya (JP)

(72) Inventor: Kensuke Okumura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 360 days.

(21) Appl. No.: 15/921,876

(22) Filed: Mar. 15, 2018

(65) Prior Publication Data

US 2018/0283783 A1 Oct. 4, 2018

(30) Foreign Application Priority Data

Mar. 28, 2017 (JP) .............................. JP2017-063636

(51) Int. Cl.
| | | |
|---|---|---|
| F26B 3/347 | (2006.01) | |
| B28B 11/24 | (2006.01) | |
| C04B 38/00 | (2006.01) | |
| C04B 33/30 | (2006.01) | |
| C04B 35/478 | (2006.01) | |

(Continued)

(52) U.S. Cl.
CPC ............ F26B 3/347 (2013.01); B28B 11/243 (2013.01); B28B 11/247 (2013.01); C04B 33/30 (2013.01); C04B 35/185 (2013.01); C04B 35/195 (2013.01); C04B 35/478 (2013.01); C04B 35/565 (2013.01); C04B 38/0006 (2013.01); F26B 15/18 (2013.01); B28B 11/248 (2013.01);

(Continued)

(58) Field of Classification Search
CPC ..................................................... F26B 7/002
See application file for complete search history.

(56) References Cited

U.S. PATENT DOCUMENTS 5,006,684 A * 4/1991 Wendt .................... B65D 81/34
219/729
2002/0112364 A1 8/2002 Yano et al.
(Continued)

FOREIGN PATENT DOCUMENTS

JP 2002-228359 A1 8/2002

OTHER PUBLICATIONS

Chinese Office Action (with English translation), Chinese Application No. 201810252889.0, dated Jun. 2, 2021 (19 pages).

(Continued)

*Primary Examiner* — Jason Lau
(74) *Attorney, Agent, or Firm* — Burr & Brown, PLLC

(57) ABSTRACT

A method for manufacturing a honeycomb structure, includes: a step of manufacturing a honeycomb formed body to manufacture a non-fired honeycomb formed body, the non-fired honeycomb formed body including a raw material composition containing a ceramic raw material, 0.5 to 5.0 mass % of pore former and water; an induction drying step of drying the manufactured non-fired honeycomb formed body by induction drying to obtain a honeycomb dried body; and a firing step of firing the obtained honeycomb dried body to obtain a honeycomb structure. The induction drying step is to remove 20 to 80% of the entire water that the non-fired honeycomb formed body contained before drying by induction drying to obtain a first dried honeycomb formed body, then turn the first dried honeycomb formed body upside down and remove the residual water by further induction drying to obtain the honeycomb dried body.

5 Claims, 1 Drawing Sheet

(51) Int. Cl.
    *C04B 35/195* (2006.01)
    *F26B 15/18* (2006.01)
    *C04B 35/185* (2006.01)
    *C04B 35/565* (2006.01)
    *C04B 111/00* (2006.01)

(52) U.S. Cl.
    CPC ........ *C04B 2111/0081* (2013.01); *C04B 2111/00793* (2013.01); *C04B 2235/606* (2013.01)

(56) References Cited

U.S. PATENT DOCUMENTS

| | | | | |
|---|---|---|---|---|
| 2005/0178022 | A1* | 8/2005 | Katsu | B28B 11/243 34/443 |
| 2006/0042116 | A1* | 3/2006 | Terazawa | B28B 11/241 34/259 |
| 2009/0235552 | A1* | 9/2009 | Takagi | B28B 11/241 34/437 |
| 2011/0227256 | A1* | 9/2011 | Okumura | F26B 3/343 264/414 |
| 2011/0240205 | A1* | 10/2011 | Kamei | B01J 35/04 156/89.11 |
| 2014/0070466 | A1 | 3/2014 | Hosoi et al. | |

OTHER PUBLICATIONS

Jinbo et al., "Drying Technology of Hollow Brick," Jindun Publishing House, dated Aug. 31, 1998, pp. 124-128 (5 pages).

\* cited by examiner

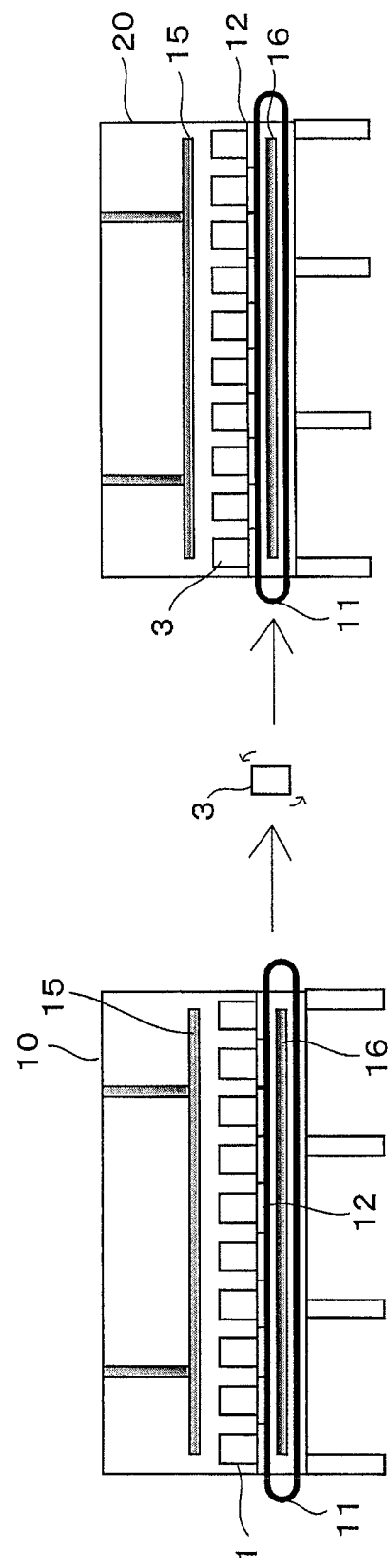

METHOD FOR MANUFACTURING HONEYCOMB STRUCTURE

"The present application is an application based on JP-2017-063636 filed on Mar. 28, 2017 with Japan Patent Office, the entire contents of which are incorporated herein by reference."

BACKGROUND OF THE INVENTION

Field of the Invention

The present invention relates to a method for manufacturing a honeycomb structure. More particularly the present invention relates to a method for manufacturing a honeycomb structure capable of drying the honeycomb formed body easily while preventing "a breakage of the honeycomb formed body" during the drying without lengthening the drying time by induction drying so as to produce the honeycomb structure effectively.

Description of the Related Art

Conventionally honeycomb structures made of ceramics have been widely used as a catalyst carrier or a various types of filters. Such a honeycomb structure made of ceramics has been used for a diesel particulate filter (DPF) as well to capture particulate matters (PMs) emitted from a diesel engine.

To produce such a honeycomb structure, a kneaded material is typically extruded to make a honeycomb-shaped formed body (honeycomb formed body), and this honeycomb formed body is dried and then fired. The kneaded material is produced by adding water and various additives, such as binder, to a ceramic material to prepare a raw material and kneading the raw material.

The following methods are known to dry the honeycomb formed body. More specifically, the known drying methods include natural drying to simply allow a honeycomb formed body to stand at room temperatures, hot-air drying to introduce hot air generated by a gas burner for drying, induction drying, and microwave drying using microwaves. The induction drying method is to apply electric current between electrodes disposed above and below the honeycomb formed body so as to generate high-frequency energy there and dry the honeycomb formed body by the high-frequency energy. According to a reported technique for the induction drying method, defects in the cells of the honeycomb formed body during drying, such as cell deformation, can be avoided by covering the honeycomb formed body with a sheet during drying (see Patent Document 1).

[Patent Document 1] JP-A-2002-228359

SUMMARY OF THE INVENTION

The method described in Patent Document 1 requires a step to prepare a sheet for covering the honeycomb formed body. Advantageously the method described in Patent Document 1 can delay the drying of the honeycomb formed body at the circumferential part so as to keep a substantially same drying speed between the outer part and the inner part of the honeycomb formed body for better balancing of the drying. Such a method, however, has a problem of requiring time to the drying and so to manufacture the honeycomb structure. That is, this method has a problem of low productivity of honeycomb structures. Another drying method including the induction drying in combination with the microwave drying is known. This method can shorten the drying time as compared with induction drying alone. This method, however, requires a microwave drying device in addition to the induction drying device, which means an increase in the device cost and requires an additional space to place the device.

In view of such problems of the conventional techniques, the present invention provides a method for manufacturing a honeycomb structure capable of drying the honeycomb formed body easily while preventing "a breakage of the honeycomb formed body" during the drying without lengthening the drying time by induction drying so as to produce the honeycomb structure effectively.

According to a first aspect of the present invention, a method for manufacturing a honeycomb structure is provided, including: a step of manufacturing a honeycomb formed body to manufacture a non-fired honeycomb formed body including a cell wall that defines a plurality of cells extending from a first end face as one end face to a second end face as the other end face, the non-fired honeycomb formed body including a raw material composition containing a ceramic raw material, 0.5 to 5.0 mass % of pore former and water; an induction drying step of drying the manufactured non-fired honeycomb formed body by induction drying to obtain a honeycomb dried body; and a firing step of firing the obtained honeycomb dried body to obtain a honeycomb structure, wherein the induction drying step is to remove 20 to 80% of the entire water that the non-fired honeycomb formed body contained before drying by induction drying to obtain a first dried honeycomb formed body, then turn the first dried honeycomb formed body upside down and remove the residual water by further induction drying to obtain the honeycomb dried body.

According to a second aspect of the present invention, the method for manufacturing a honeycomb structure according to the first aspect is provided, wherein the non-fired honeycomb formed body to be supplied to the induction drying step has water content before drying of 20 to 50%.

According to a third aspect of the present invention, the method for manufacturing a honeycomb structure according to the first or second aspects is provided, further including a hot air drying step of further drying the honeycomb dried body subjected to the induction drying step by hot air.

According to a fourth aspect of the present invention, the method for manufacturing a honeycomb structure according to any one of the first to third aspects is provided, wherein the non-fired honeycomb formed body to be supplied to the induction drying step has a thickness of the cell wall that is 50 to 350 μm.

According to a fifth aspect of the present invention, the method for manufacturing a honeycomb structure according to any one of the first to fourth aspects is provided, wherein, in the induction drying step, drying is performed using a first induction drying device to obtain the first dried honeycomb formed body and a second induction drying device to further induction-dry the first dried honeycomb formed body to obtain the honeycomb dried body.

A method for manufacturing a honeycomb structure of the present invention is capable of drying the honeycomb formed body easily while preventing a breakage of the honeycomb formed body during the drying without lengthening the drying time by induction drying so as to produce the honeycomb structure effectively.

BRIEF DESCRIPTION OF THE DRAWING

FIG. 1 schematically describes an induction drying step in one embodiment of a method for manufacturing a honeycomb structure of the present invention.

DESCRIPTION OF THE PREFERRED EMBODIMENTS

The following specifically describes embodiments of the present invention, with reference to the drawing. The present invention is not limited to the following embodiments. The present invention is to be understood to include the following embodiments, to which modifications and improvements are added as needed based on the ordinary knowledge of a person skilled in the art without departing from the scope of the present invention.

(1) Method for Manufacturing a Honeycomb Structure:

One embodiment of a method for manufacturing the honeycomb structure of the present invention includes a step of manufacturing a honeycomb formed body, an induction drying step, and a firing step. A honeycomb structure can be manufactured through these steps. More specifically, the step of manufacturing a honeycomb formed body is to manufacture "a non-fired honeycomb formed body including a cell wall that defines a plurality of cells extending from a first end face as one end face to a second end face as the other end face". This non-fired honeycomb formed body includes a raw material composition containing a ceramic raw material and water. The induction drying step is to dry the manufactured non-fired honeycomb formed body by induction drying so as to obtain a honeycomb dried body. This induction drying step has a first drying step to obtain "a first dried honeycomb formed body obtained by removing 20 to 80% of the entire water that the non-fired honeycomb formed body contained before drying by induction drying". This induction drying step also has a step following the first drying step to turn the first dried honeycomb formed body upside down and then a second drying step to remove the residual water by additional induction drying to obtain a honeycomb dried body. The firing step is to fire the obtained honeycomb dried body to obtain a honeycomb structure.

The method for manufacturing a honeycomb structure of the present invention can avoid "a breakage of the honeycomb formed body" during drying without lengthening the drying time by induction drying as in the conventional technique. The method for manufacturing a honeycomb structure of the present invention can dry the honeycomb formed body easily, because the honeycomb formed body can be dried by induction drying only instead of combining the induction drying with microwave drying. Therefore the induction drying step can be performed favorably, and so a honeycomb structure can be produced effectively.

In a conventionally known method for manufacturing a honeycomb structure, "the non-fired honeycomb formed body" is induction-dried while covering the honeycomb formed body as described in Patent Document 1. This method requires a step to prepare a sheet for covering the honeycomb formed body. The method described in Patent Document 1 has another problem of requiring time to the drying and correspondingly time to manufacture the honeycomb structure. That is, this method has a problem of low productivity of honeycomb structures. Another drying method including the induction drying in combination with the microwave drying is known, which includes the microwave drying step performed at the latter half of the drying step where overheating (specifically heating at 150° C. or more) tends to occur. This method can shorten the drying time as compared with the method including induction drying only to dry the honeycomb formed body. This method, however, is limited in the material of the honeycomb formed body because the jig, such as a carrier, is shared between these drying steps. This method has another problem that unless microwaves output for drying are appropriately managed in accordance with the drying state of the honeycomb formed body after induction drying, drying progresses excessively and ignition of the honeycomb formed body may occur. This method requires a microwave drying device in addition to the induction drying device, which means an increase in the cost and requires an additional space to place the microwave drying device.

Then, the honeycomb formed body may be dried by induction drying only. Such a method, however, has a problem that the output from the induction drying device cannot be increased enough because, if overheating occurs as the induction drying progresses, the electrical resistance of the honeycomb formed body becomes large. Another problem of this method is that, if overheating occurs as the induction drying progresses, voltage between electrodes easily increases and so the load applied to the induction drying device increases, which leads to an increase of the risk of discharging. To solve these problems, a honeycomb formed body is covered with a sheet during induction drying in a known method as described in Patent Document 1. This method, however, requires time and manpower for drying as stated above, and so has low productivity. On the contrary, the present invention can reduce water locally remaining in the honeycomb formed body, and so can suppress overheating. Therefore there is no need to lengthen the drying time excessively, and the load applied to the facility (induction drying device) also can be reduced. Therefore the induction drying step of the present invention can be performed favorably.

FIG. 1 schematically shows the induction drying step in the method for manufacturing a honeycomb structure of the present invention. As shown in FIG. 1, a non-fired honeycomb formed body 1 is placed on a perforated plate 12 disposed on a conveyor 11 of an induction drying device (first induction drying device) 10, and voltage is applied to electrode plates 15, 16 located above and below the non-fired honeycomb formed body 1. Then, the honeycomb formed body is dried using high-frequency energy. In this way, the non-fired honeycomb formed body 1 is induction-dried under the predetermined condition as stated above to obtain a first dried honeycomb formed body 3 (first drying step). Thereafter, the first dried honeycomb formed body 3 is turned upside down and is placed on a perforated plate 12 disposed on a conveyor 11 of an induction drying device (second induction drying device) 20, and voltage is applied to electrode plates 15, 16 located above and below the first dried honeycomb formed body 3. Then, the honeycomb formed body is dried using high-frequency energy. In this way, the first dried honeycomb formed body 3 is induction-dried to obtain a honeycomb dried body (second drying step).

In the induction drying step of the present invention, the method for turning the first dried honeycomb formed body 3 upside down is not limited especially. For instance, as shown in FIG. 1, two induction drying devices (the first induction drying device 10 and the second induction drying device 20) may be prepared, and a robot arm may be disposed between these devices. More specifically, lateral faces of the first dried honeycomb formed body discharged from the first induction drying device are grasped with the robot arm to turn the first dried honeycomb formed body upside down, and then is supplied to the second induction drying device. It should be noted that the process is preferably controlled beforehand so that when the non-fired honeycomb formed body is discharged from the first induction drying device 10, 20 to 50% of the entire water that the non-fired honeycomb formed body contained before the drying has been removed. Instead of the robot arm, a human operator may perform the above operation.

In this way, the induction drying step may be performed using a plurality of induction drying devices. This method of the present invention can be performed easily because a conventional induction drying device can be used as it is.

Instead of using a plurality of induction drying devices as stated above, one induction drying device may be used. In this case, means to turn a non-fired honeycomb formed body upside down (turning means) may be disposed in the induction drying device.

(1-1) Step of Manufacturing a Honeycomb Formed Body:

In the step of manufacturing a honeycomb formed body, "a non-fired honeycomb formed body including a cell wall that defines a plurality of cells extending from a first end face as one end face to a second end face as the other end face" is manufactured by forming a raw material composition containing a ceramic raw material and water as stated above. Herein the non-fired honeycomb formed body refers to a honeycomb formed body in the state where particles of the ceramic raw material are present while keeping the particulate shape when the raw material composition is formed into a honeycomb shape and the ceramic raw material is not sintered.

The ceramic raw material contained in the raw material composition preferably includes at least one type of materials selected from the group consisting of cordierite forming raw material, cordierite, silicon carbide, silicon-silicon carbide composite material, mullite, and aluminum titanate. The cordierite forming raw material is a ceramic raw material formulated to have a chemical composition in the range of 42 to 56 mass % of silica, 30 to 45 mass % of alumina and 12 to 16 mass % of magnesia. The cordierite forming raw material forms cordierite after firing.

The raw material composition may be prepared by mixing the ceramic raw material and water as stated above with dispersing medium, organic binder, inorganic binder, pore former, surfactant and the like. The composition ratio of these raw materials is not limited especially, and any composition ratio suitable for the structure and materials of the honeycomb structure to be manufactured is preferable.

When the raw material composition is formed, the raw material composition is firstly kneaded to be a kneaded material, and the obtained kneaded material is formed to have a honeycomb shape having a plurality of through holes so as to make a honeycomb formed body. A method for preparing the kneaded material by kneading the raw material composition may be a method using a kneader or a vacuum pugmill, for example. A method for forming the kneaded material to make a honeycomb formed body may be a known forming method, such as extrusion and injection molding. More specifically, a honeycomb formed body is preferably made by extrusion using a die having a desired cell shape, partition wall (cell wall) thickness and cell density. A preferable material of the die is cemented carbide having wear resistance.

The shape of cells of the non-fired honeycomb formed body (the shape of cells in a cross section orthogonal to the extending direction of the cells) is not limited especially. Examples of the shape of cells include a triangle, a quadrangle, a hexagon, an octagon, a circle and the combination of them.

The shape of the honeycomb formed body is not limited especially, and the examples of the shape include a round pillar shape, an elliptic pillar shape, and a polygonal prismatic columnar shape having an end face of a shape, such as "square, rectangle, triangle, pentagon, hexagon, and octagon".

When the honeycomb formed body has a round pillar shape, the non-fired honeycomb formed body may have a diameter at the end face of 50 to 400 mm, preferably 80 to 400 mm, and more preferably 80 to 350 mm.

The non-fired honeycomb formed body may have a length in the cell-extending direction of 100 to 400 mm, preferably 150 to 400 mm, and more preferably 150 to 350 mm.

The honeycomb formed body may have a thickness of the cell wall of 50 to 350 μm. That is, the non-fired honeycomb formed body to be supplied to the induction drying step may have a thickness of the cell wall of 50 to 350 μm. Preferably the honeycomb formed body may have a thickness of the cell wall of 70 to 350 μm, and more preferably 100 to 320 μm. When a honeycomb formed body has a thickness of the cell wall in the above range, a breakage easily occurs at the partition wall during drying in the conventional method. On the contrary, the present invention can suppress such a breakage at a thin partition wall as well, as described above. Note here that a breakage occurs at the non-fired honeycomb formed body during drying due to non-uniform distribution of water in the non-fired honeycomb formed body and so a difference in contraction generated in the non-fired honeycomb formed body. Especially such a difference in contraction greatly affects a thin cell wall, and therefore a breakage easily occurs at the cell wall. According to the present invention, a non-fired honeycomb formed body is turned upside down under a predetermined condition during the induction drying step, whereby a difference in contraction during drying can be suppressed.

The content of water in a non-fired honeycomb formed body may vary with the characteristics required for the product. In the present invention, a non-fired honeycomb formed body having the water content in the range of 20 to 50% is preferably used. That is, the non-fired honeycomb formed body to be supplied to the induction drying step preferably has the water content before drying of 20 to 50%. Preferably the water content of this non-fired honeycomb formed body is in the range of 25 to 50%, and more preferably 30 to 50%. The water content of the "non-fired honeycomb formed body" is a value obtained by measuring about the raw material composition with an infrared heating moisture meter.

(1-2) Induction Drying Step:

The induction drying step is to dry the manufactured non-fired honeycomb formed body by induction drying so as to obtain a honeycomb dried body. More specifically, this induction drying step includes a first drying step, a subsequent step of turning upside down, and a second drying step. In this way, the present invention includes the step of turning the first dried honeycomb formed body upside down between the first drying step and the second drying step. Such an induction drying step having these steps can remove water of the non-fired honeycomb formed body uniformly between at an upper part and a lower part (that is, can dry the non-fired honeycomb formed body uniformly), and so can avoid a breakage of the honeycomb formed body during drying without lengthening the drying time by induction drying.

The induction drying method is to apply electric current between electrodes disposed above and below the honeycomb formed body so as to generate high-frequency energy there and dry the honeycomb formed body by the high-frequency energy. The induction drying is performed using an induction drying device including one electrode (upper electrode) located above the non-fired honeycomb formed body and the other electrode (lower electrode) located below the non-fired honeycomb formed body. This induction drying device is configured so that "distance D1" between the upper end face of the non-fired honeycomb formed body and the upper electrode and "distance D2" between the lower end face of the non-fired honeycomb formed body and the lower electrode are different, and the distance D is longer than the distance D2. Such a distance between the upper end face (first end face) of the non-fired honeycomb formed body and the upper electrode is called an air gap. This air gap allows the water at an upper part of the non-fired honeycomb formed body to remain more than the water at a lower part. Note here that a non-fired honeycomb formed body containing water more (specifically 20 to 50% of the water content) particularly tends to have non-uniform distribution of the water therein during induction drying. As a result, water is distributed non-uniformly in such a non-fired honeycomb formed body. Such non-uniform distribution of water greatly degrades the efficiency of drying by the induction drying device, and so the drying does not progress well. To progress the drying, another drying step, such as microwave drying, after the induction drying is added, or the time of the induction drying is lengthened. It is difficult to correct such non-uniform distribution of water by using an auxiliary electrode.

When another drying processing, such as microwave drying, is performed in addition to the induction drying, a device for the drying and a space to place the device are required as stated above, and so the manpower and cost increases. When the time of induction drying is lengthened, the time to manufacture the honeycomb structure is greatly lengthened and electrical power is required a lot, and so the cost increases. Then, there is a demand for a method of substantially finishing the drying of a non-fired honeycomb formed body by induction drying.

According to the present invention, a non-fired honeycomb formed body can be almost dried by induction drying (dried so that the water content of the honeycomb dried body is 3% or less), and there is no need to lengthen the drying time.

(1-2-1) First Drying Step:

In this step, "a first dried honeycomb formed body" is obtained by removing "20 to 80% of the entire water that the non-fired honeycomb formed body contained before drying". That is, this step ends when 20 to 80% of the entire water that the non-fired honeycomb formed body contained before drying is removed, and then the procedure shifts to the second drying step.

The water content of the first dried honeycomb formed body is obtained by measuring the weight of the non-fired honeycomb formed body before drying and the weight of the honeycomb formed body after induction drying (first dried honeycomb formed body) to find the amount of removed water, and calculating the water content based on the removed amount of water. Induction drying may be performed beforehand under a plurality of drying conditions so as to find a condition achieving the water content of the first dried honeycomb formed body in the range as stated above.

In the first drying step of the present invention, 20 to 80% of the entire water that the non-fired honeycomb formed body contained before drying is removed. Preferably 20 to 60% of the entire water that the non-fired honeycomb formed body contained before drying is removed, and more preferably 30 to 40% of the water is removed. If this step ends when less than 20% of the entire water that the non-fired honeycomb formed body contained before drying is removed, a difference in contraction is generated between a non-dried part (a part where the drying is not sufficient) and another part during the following step (hot air drying step and firing step), and so a breakage may occur at the cell wall (partition wall). When the cell wall is thin (specifically 78 μm or less), such a breakage occurs often. If this step ends when 80% and above of the entire water that the non-fired honeycomb formed body contained before drying is removed, the honeycomb formed body has large electrical resistance, and so the output cannot be increased enough. Therefore the efficiency of the drying processing deteriorates. This leads to an increase in voltage between the electrodes, and so the load applied to the induction drying device increases, which leads to an increase of the risk of discharging. In this case, malfunction of the device may occur frequently due to the discharging. When a honeycomb formed body including water absorbable resin as the pore former is dried, non-uniform distribution of the drying easily happens during the induction drying, i.e., the water is easily distributed non-uniformly between the upper part and the lower part of the honeycomb formed body. When 80% and above of the entire water is dissipated (removed) from such a honeycomb formed body, overheating occurs at a center part of the honeycomb formed body. In this case, it is difficult to continue the drying.

The pore former is not limited especially, and can be selected as needed. For instance, the examples of the pore former include water absorbable resin, silica gel and coke. The "water absorbable resin" refers to resin having a property of swelling to a few to dozens of times its volume when the resin absorbs water. The example of such resin includes sodium polyacrylate.

In the present invention, the additive amount of the pore former is 0.5 to 5.0 mass % in the raw material composition.

(1-2-2) Turning Upside Down Step:

This step is to turn the first dried honeycomb formed body upside down. Since the present invention includes such a turning upside down step, the water in the honeycomb formed body can be made uniform as the induction drying progresses. Therefore the present invention can suppress a breakage of the honeycomb formed body, and does not have to lengthen the time of induction drying as in the conventional technique. As a result, the time to manufacture the honeycomb structure can be shortened.

"Turning the first dried honeycomb formed body upside down" refers to inversion of one end face and the other end face in position of the first dried honeycomb formed body. That is, as shown in FIG. 1, the pillar-shaped first dried honeycomb formed body having one end face and the other end face is typically disposed with the one end face (first end face) upward and the other end face (second end face) downward for induction drying. Then, the operation to invert these first end face and second end face in position is called "turning upside down".

(1-2-3) Second Drying Step:

This step is to remove the residual water by additional induction drying to obtain a honeycomb dried body. The condition of induction drying in this step may be similar to that in the induction drying step in the first drying step. Alternatively, a condition different from the induction drying step in the first drying step may be used.

After this step, 90% or more of the entire amount of water of the non-fired honeycomb formed body is preferably removed, i.e., the water content of the honeycomb dried body is 3% or less. This can suppress a "breakage" also in the following step (hot air drying step or firing step).

In the induction drying step (first drying step and second drying step), a conventionally known condition may be used as needed for the frequency and the output. For instance, the frequency may be 10 to 50 MHz. The output may be 5 to 200 kW.

Preferably the induction drying step is performed while keeping the temperature at a center part of each of the non-fired honeycomb formed body and the first dried honeycomb formed body at 150° C. or lower. This can avoid deformation of the non-fired honeycomb formed body and the first dried honeycomb formed body. If the temperature of the non-fired honeycomb formed body exceeds 150° C., organic auxiliary agent, which is mixed to improve the shape-retainability of the non-fired honeycomb formed body, reaches its combustion temperature range, and so the strength of the honeycomb formed body after drying is not enough and the first dried honeycomb formed body may collapse.

The temperature of a center part of the non-fired honeycomb formed body and the first dried honeycomb formed body may be measured by embedding a compact temperature-measuring device in a product (non-fired honeycomb formed body before drying) in a preliminary test. Preferably a condition that can keep the temperature of a center part of the non-fired honeycomb formed body and the first dried honeycomb formed body at 150° C. or less is found beforehand.

(1-2-4) Hot Air Drying Step:

The present invention may further include a hot air drying step to dry the honeycomb dried body subjected to the induction drying step by hot air.

Such a hot air drying step can further dry the honeycomb dried body. The induction drying step of the present invention can prevent the flow path of hot air during the hot air drying step from being transferred to the honeycomb dried body. That is, this can prevent burning of the end face on one side of the honeycomb dried body due to hot air. In this way, the induction drying step of the present invention can lead to favorable drying processing also in the following hot air drying step.

For this hot air drying step, a conventionally known method may be used as needed.

(1-3) Firing Step:

In the firing step, the honeycomb dried body subjected to the induction drying step is fired to obtain a honeycomb structure.

The honeycomb dried body may be fired in a firing oven, for example. For the firing oven and the firing condition, a conventionally known condition may be selected as needed to be suitable for the shape, the material and the like of the honeycomb dried body. The honeycomb dried body may be calcinated before the firing to burn and remove organic substances, such as binder.

EXAMPLES

The following describes the present invention more specifically by way of examples. The present invention is not limited to the following examples.

Example 1

As the ceramic raw material, a cordierite forming raw material including the mixture of alumina, kaolin and talc was used. Then, binder including organic binder, water absorbable resin (2.8 mass % of the raw material composition) as the pore former, and water (76 mass % of the raw material composition) as the dispersing medium were mixed and kneaded to obtain a kneaded material (raw material composition) (step of manufacturing a honeycomb formed body).

The obtained kneaded material was extruded so as to obtain a non-fired honeycomb formed body having cells of a square in cross section orthogonal to the cell-extending direction. The non-fired honeycomb formed body had a diameter of 140 mm, a length (length in the cell-extending direction) of 210 mm, and this honeycomb formed body had externally a round pillar shape.

The obtained non-fired honeycomb formed body had the water content of 42% (in Table 1, described as "initial water content"), the cell density of 47 pieces/cm$^2$, the thickness of cell wall of 200 m, and the mass (mass before drying) of 1501.7 g. This non-fired honeycomb formed body was dried as follows.

The obtained non-fired honeycomb formed body was induction-dried using an inducting drying device. Specifically, the non-fired honeycomb formed body was induction-dried (dried by the first induction drying device (first drying step)) as a batch with the frequency of 40 MHz, the output of 4 kW and the heating time of 480 seconds. In this way, a first dried honeycomb formed body (having mass (mass before turning upside down) of 1033 g) was obtained by removing 76.1% of the entire water that the non-fired honeycomb formed body contained before drying. The water content of the first dried honeycomb formed body was 9.8%. Under the above-stated drying condition, the temperature (highest temperature) of the center part of the non-fired honeycomb formed body was 127° C. (150° C. or lower). This temperature of the non-fired honeycomb formed body was measured with an optical fiber thermometer.

In Table 2 and Table 5, "first removal ratio (%)" indicates the ratio (%) of the water amount removed at the first drying step relative to the mass before drying. More specifically this is the value calculated in accordance with the expression: (1−(mass before turning upside down/mass before drying))× 100. "First drying ratio (%)" indicates the ratio (%) of the water amount removed at the first drying step relative to the water content of the non-fired honeycomb formed body. More specifically this is the value calculated in accordance with the expression: (mass before drying−mass before turning upside down)/(mass before drying×initial water content)×100. This "first drying ratio (%)" indicates the amount of water removed from the entire water amount that the non-fired honeycomb formed body contained before drying. That is, it is necessary for the present invention that this first drying ratio (%) is 20 to 80%.

Next, induction drying was further performed using the above-mentioned induction drying device. At this time, the first dried honeycomb formed body was turned upside down and then was placed at the induction drying device. The drying was performed under a similar condition to the above. Specifically, the drying was performed with the frequency of 40 MHz, the output of 4 kW and the heating time of 120 seconds. In this way, the residual water was removed so as to obtain a honeycomb dried body (dried by a second induction drying device (second drying step)). The temperature of the center part of the second dried honeycomb formed body was 136° C. (150° C. or less).

Next, the water content of the honeycomb dried body was measured to confirm that the honeycomb dried body was dried. The result showed that the water content of the honeycomb dried body was 2.4% (see Table 2). The honeycomb dried body had mass (final mass) of 923 g. In Table 2 and Table 5, "final removal ratio (%)" indicates the ratio (%) of the total removed water amount relative to the mass before drying in the induction drying step (first drying step and second drying step). "Final drying ratio (%)" indicates the ratio (%) of the total removed water amount in the induction drying step (first drying step and second drying step) relative to the amount of water contained in the non-fired honeycomb formed body.

As shown in Table 3, the honeycomb dried body obtained in this Example had a locally remaining moisture percentage at the upper part (one end part) of 9.7% and a locally remaining moisture percentage at the lower part (the other end part) of 0.2%. A difference between them (upper part-lower part) was 9.5%. In this measurement of the locally remaining moisture percentage, the "upper part" means a position of 20 mm in depth from the one end face (end face located above in the first drying step) of the honeycomb dried body. In the measurement of the locally remaining moisture percentage, the "lower part" means a position of 20 mm in depth from the other end face (end face located below in the first drying step) of the honeycomb dried body.

The locally remaining moisture percentage was measured using a soil moisture sensor (produced by DECAGON, probe EC-5 (product name)) by the electric capacitance method. The locally remaining moisture percentage was measured by inserting the soil moisture sensor into the measurement target (non-fired honeycomb formed body) by 60 mm from the lateral face at the depth (20 mm) from the end face of the measurement target (non-fired honeycomb formed body).

(The Number of Generated Breakages During Drying)

In the method of the present example, fifty honeycomb dried body were selected randomly from the obtained honeycomb dried bodies, and the appearance of them was visually examined about the presence or not of a breakage of the honeycomb formed body (i.e., about the presence of a breakage of the honeycomb formed body). Two of the fifty honeycomb dried body had a breakage.

(The Number of Generated Breakages of Honeycomb Structures)

These honeycomb dried bodies were fired to obtain honeycomb structures. A breakage occurred at three of the fifty honeycomb structures (the number of the honeycomb structures having a breakage)). Table 3 and Table 6 show the result. Firing was performed at 1400° C. for 5 hours.

(Total Drying Time (Sec.))

The drying time in the induction drying step was measured for each of the honeycomb dried bodies manufactured. Table 3 and Table 6 show the result in the fields of "total drying time (sec.))".

TABLE 1

| | Non-fired honeycomb formed body | | | | | | | |
|---|---|---|---|---|---|---|---|---|
| | Outer shape | Diameter (mm) | Length (mm) | Cell wall thickness (μm) | Cell density (pieces/cm$^2$) | Mass before drying (g) | Additive amount of pore former (mass %) | Initial water content (%) |
| Comp. Ex. 1 | round-pillar shape | 140 | 210 | 200 | 47 | 1506.2 | 2.8 | 42 |
| Comp. Ex. 2 | round-pillar shape | 140 | 210 | 200 | 47 | 1500 | 2.8 | 42 |
| Comp. Ex. 3 | round-pillar shape | 160 | 210 | 150 | 34 | 1646 | 0.98 | 24 |
| Ex. 1 | round-pillar shape | 140 | 210 | 200 | 47 | 1501.7 | 2.8 | 42 |
| Ex. 2 | round-pillar shape | 140 | 210 | 200 | 47 | 1504.5 | 2.8 | 42 |
| Ex. 3 | round-pillar shape | 140 | 210 | 200 | 47 | 1502.4 | 2.8 | 42 |
| Ex. 4 | round-pillar shape | 140 | 210 | 200 | 47 | 1489.2 | 2.8 | 42 |
| Ex. 5 | round-pillar shape | 140 | 210 | 200 | 47 | 1497.1 | 4.1 | 42 |
| Ex. 6 | round-pillar shape | 160 | 210 | 150 | 34 | 1653 | 0.98 | 24 |
| Comp. Ex. 4 | round-pillar shape | 140 | 210 | 200 | 47 | 1502 | 2.8 | 42 |

TABLE 2

| | First step | | | | First dried honeycomb formed body | | | | Second step |
|---|---|---|---|---|---|---|---|---|---|
| | Frequency (MHz) | Output (kW) | Time (sec.) | Temperature at center part (° C.) | Mass before turning (g) | Water content (%) | First removal ratio (%) | First drying ratio (%) | Frequency (MHz) |
| Comp. Ex. 1 | 40 | 4 | 600 | 153 | 935 | 3.1 | 37.9 | 92.4 | 40 |
| Comp. Ex. 2 | 40 | 4 | 540 | 151 | 981 | 6.4 | 34.6 | 84.3 | 40 |
| Comp. Ex. 3 | 40 | 4 | 360 | 152 | 1274 | 1.4 | 22.6 | 90.0 | 40 |
| Ex. 1 | 40 | 4 | 480 | 127 | 1033 | 9.8 | 31.2 | 76.1 | 40 |
| Ex. 2 | 40 | 4 | 330 | 105 | 1150 | 17.4 | 23.6 | 57.5 | 40 |
| Ex. 3 | 40 | 4 | 240 | 97 | 1214 | 21.8 | 19.2 | 46.8 | 40 |
| Ex. 4 | 40 | 4 | 180 | 98 | 1293 | 27.8 | 13.2 | 32.1 | 40 |
| Ex. 5 | 40 | 4 | 110 | 92 | 1371 | 32.6 | 8.4 | 20.5 | 40 |
| Ex. 6 | 40 | 4 | 150 | 101 | 1455 | 12.0 | 12.0 | 50.0 | 40 |
| Comp. Ex. 4 | 40 | 4 | 60 | 83 | 1463 | 38.4 | 2.6 | 6.3 | 40 |

TABLE 2-continued

| | | Second step | | Honeycomb dried body | | | |
|---|---|---|---|---|---|---|---|
| | | Output (kW) | Time (sec.) | Temperature at center part (° C.) | Final mass (g) | Water content (%) | Final removal ratio (%) | Final drying ratio (%) |
| Comp. Ex. 1 | 4 | 30 | 146 | 929 | 2.7 | 38.3 | 91.3 |
| Comp. Ex. 2 | 4 | 90 | 135 | 922 | 2.5 | 38.5 | 91.7 |
| Comp. Ex. 3 | 4 | 60 | 141 | 1261 | 0.6 | 23.4 | 97.5 |
| Ex. 1 | 4 | 120 | 136 | 923 | 2.4 | 38.6 | 91.8 |
| Ex. 2 | 4 | 240 | 133 | 924 | 2.4 | 38.6 | 91.9 |
| Ex. 3 | 4 | 330 | 137 | 919 | 2.2 | 38.8 | 92.4 |
| Ex. 4 | 4 | 400 | 135 | 911 | 2.2 | 38.8 | 92.5 |
| Ex. 5 | 4 | 480 | 138 | 922 | 2.6 | 38.4 | 91.4 |
| Ex. 6 | 4 | 200 | 132 | 1268 | 0.7 | 23.3 | 97.0 |
| Comp. Ex. 4 | 4 | 540 | 153 | 934 | 3.2 | 37.8 | 90.1 |

TABLE 3

| | Locally remaining moisture percentage (%) | | | The number of breakages during drying | The number of breakages of honeycomb structures | Total drying time (sec.) |
|---|---|---|---|---|---|---|
| | Upper part | Lower part | Difference (upper − lower) | | | |
| Comp. Ex. 1 | 11.8 | 0.2 | 11.6 | 11 | 13 | 630 |
| Comp. Ex. 2 | 8.3 | 0.0 | 8.3 | 2 | 4 | 630 |
| Comp. Ex. 3 | 5.2 | 0.0 | 5.2 | 1 | 0 | 420 |
| Ex. 1 | 9.7 | 0.2 | 9.5 | 2 | 3 | 600 |
| Ex. 2 | 6.0 | 0.0 | 6.0 | 0 | 1 | 570 |
| Ex. 3 | 5.9 | 1.3 | 4.6 | 0 | 0 | 570 |
| Ex. 4 | 3.5 | 1.5 | 2.0 | 0 | 0 | 580 |
| Ex. 5 | 1.8 | 5.7 | −3.9 | 1 | 3 | 590 |
| Ex. 6 | 2.1 | 1.9 | 0.2 | 0 | 0 | 350 |
| Comp. Ex. 4 | 1.1 | 12.0 | −10.9 | 14 | 16 | 600 |

Examples 2 to 8, Comparative Examples 1 to 6

Honeycomb structures were manufactured similarly to Example 1 except that the conditions were changed as in Table 1, Table 2, Table 4 and Table 5. Table 3 and Table 6 show the evaluation result of the honeycomb dried bodies and the honeycomb structures in this method. Comparison between Comparative Example 3 and Example 6 shows that the total drying time was shorter in Example 6.

TABLE 4

| | Non-fired honeycomb formed body | | | | | | |
|---|---|---|---|---|---|---|---|
| | Outer shape | Diameter (mm) | Length (mm) | Cell wall thickness (μm) | Cell density (pieces/cm$^2$) | Mass before drying (g) | Additive amount of pore former (mass %) | Initial water content (%) |
| Comp. Ex. 5 | Round pillar shape | 140 | 200 | 200 | 62 | 1505 | 2.8 | 42 |
| Ex. 7 | Round pillar shape | 140 | 200 | 200 | 62 | 1489 | 2.8 | 42 |
| Ex. 8 | Round pillar shape | 140 | 200 | 200 | 62 | 1493 | 2.8 | 42 |
| Comp. Ex. 6 | Round pillar shape | 140 | 200 | 200 | 62 | 1512 | 2.8 | 42 |

TABLE 5

| | First step | | | | First dried honeycomb formed body | | | | |
|---|---|---|---|---|---|---|---|---|---|
| | Frequency (MHz) | Output (kW) | Time (sec.) | Temperature at center part (° C.) | Mass before turning (g) | Water content (%) | First removal ratio (%) | First drying ratio (%) | Second step Frequency (MHz) |
| Comp. Ex. 5 | 40 | 2 | 1200 | 158 | 878 | 0.3 | 41.7 | 99.2 | — |
| Ex. 7 | 40 | 2 | 500 | 98 | 1211 | 23.3 | 18.7 | 44.5 | 40 |
| Ex. 8 | 40 | 2 | 240 | 92 | 1340 | 31.8 | 10.2 | 24.4 | 40 |

TABLE 5-continued

| | | | | | | | | | |
|---|---|---|---|---|---|---|---|---|---|
| Comp. Ex. 6 | 40 | 2 | 180 | 76 | 1405 | 34.9 | 7.1 | 16.8 | 40 |

| | Second step | | | Honeycomb dried body | | | |
|---|---|---|---|---|---|---|---|
| | Output (kW) | Time (sec.) | Temperature at center part (° C.) | Final mass (g) | Water content (%) | Final removal ratio (%) | Final drying ratio (%) |
| Comp. Ex. 5 | — | — | — | 878 | 0.3 | 41.7 | 99.2 |
| Ex. 7 | 2 | 670 | 134 | 874 | 0.7 | 41.3 | 98.3 |
| Ex. 8 | 2 | 810 | 139 | 887 | 1.4 | 40.6 | 96.6 |
| Comp. Ex. 6 | 2 | 1100 | 143 | 886 | 0.6 | 41.4 | 98.6 |

TABLE 6

| | Locally remaining moisture percentage (%) | | | The number | | |
|---|---|---|---|---|---|---|
| | Upper part | Lower part | Difference (upper − lower) | The number of breakages during drying | of breakages of honeycomb structures | Total drying time (sec.) |
| Comp. Ex. 5 | 4.2 | 0.3 | 3.9 | 1 | 3 | 1200 |
| Ex. 7 | 4.6 | 0.4 | 4.2 | 0 | 1 | 1170 |
| Ex. 8 | 3.1 | 3.5 | −0.4 | 0 | 0 | 1050 |
| Comp. Ex. 6 | 0.2 | 4.6 | −4.4 | 0 | 2 | 1280 |

Table 3 and Table 6 show that the method for manufacturing a honeycomb structure of Examples 1 to 8 prevented a breakage of the honeycomb formed body during drying without lengthening the drying time by induction drying as compared with the method for manufacturing a honeycomb structure of Comparative Examples 1 to 6. The method for manufacturing a honeycomb structure of Examples 1 to 8 enabled simple drying by induction drying only (that is, without microwave drying after the induction drying). In this way, the method for manufacturing a honeycomb structure of Examples 1 to 8 produced a honeycomb structure effectively.

A method for manufacturing a honeycomb structure of the present invention can be used to manufacture a honeycomb structure available as a filter to purify exhaust gas.

DESCRIPTION OF REFERENCE NUMERALS

1: Non-fired honeycomb formed body, 3: First dried honeycomb formed body, 10: First induction drying device, 11: Conveyor, 12: Perforated plate, 15, 16: Electrode plates, 20: Second induction drying device

What is claimed is:

1. A method for manufacturing a honeycomb structure, comprising:
   a step of manufacturing a honeycomb formed body to manufacture a non-fired honeycomb formed body including a cell wall that defines a plurality of cells extending from a first end face as one end face to a second end face as the other end face, the non-fired honeycomb formed body including a raw material composition containing a ceramic raw material, 0.5 to 5.0 mass % of pore former and water;
   an induction drying step of drying the manufactured non-fired honeycomb formed body by induction drying to obtain a honeycomb dried body; and
   a firing step of firing the obtained honeycomb dried body to obtain a honeycomb structure, wherein
   the induction drying step is to remove 20 to 80% of the entire water that the non-fired honeycomb formed body contained before drying by induction drying to obtain a first dried honeycomb formed body, then turn the first dried honeycomb formed body upside down and remove the residual water by further induction drying to obtain the honeycomb dried body.

2. The method for manufacturing a honeycomb structure according to claim 1, wherein the non-fired honeycomb formed body to be supplied to the induction drying step has water content before drying of 20 to 50%.

3. The method for manufacturing a honeycomb structure according to claim 1, further comprising a hot air drying step of further drying the honeycomb dried body subjected to the induction drying step by hot air.

4. The method for manufacturing a honeycomb structure according to claim 1, wherein the non-fired honeycomb formed body to be supplied to the induction drying step has a thickness of the cell wall that is 50 to 350 μm.

5. The method for manufacturing a honeycomb structure according to claim 1, wherein, in the induction drying step, drying is performed using a first induction drying device to obtain the first dried honeycomb formed body and a second induction drying device to further induction-dry the first dried honeycomb formed body to obtain the honeycomb dried body.

* * * * *